US011832174B2

(12) United States Patent
Desai et al.

(10) Patent No.: US 11,832,174 B2
(45) Date of Patent: Nov. 28, 2023

(54) BSS-COLOR GRADING IN A WLAN INFRASTRUCTURE

(71) Applicant: Cisco Technology, Inc., San Jose, CA (US)

(72) Inventors: Vishal S. Desai, San Jose, CA (US); Jerome Henry, Pittsboro, NC (US); Matthew A. Silverman, Shaker Heights, OH (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 16/752,219

(22) Filed: Jan. 24, 2020

(65) Prior Publication Data

US 2021/0235375 A1    Jul. 29, 2021

(51) Int. Cl.
| | | |
|---|---|---|
| H04W 48/20 | (2009.01) | |
| H04W 24/02 | (2009.01) | |
| H04W 28/02 | (2009.01) | |
| H04W 48/16 | (2009.01) | |
| H04W 48/12 | (2009.01) | |
| H04W 74/00 | (2009.01) | |
| H04W 84/12 | (2009.01) | |
| H04W 74/08 | (2009.01) | |

(52) U.S. Cl.
CPC ........... *H04W 48/20* (2013.01); *H04W 24/02* (2013.01); *H04W 28/0268* (2013.01); *H04W 48/16* (2013.01)

(58) Field of Classification Search
CPC . H04W 48/20; H04W 28/0268; H04W 24/02; H04W 48/16; H04W 48/12; H04W 74/006; H04W 84/12; H04W 74/0825

USPC ......................................................... 370/329
See application file for complete search history.

(56) References Cited

U.S. PATENT DOCUMENTS

| | | |
|---|---|---|
| 10,104,664 B2 | 10/2018 | Liu et al. |
| 10,362,489 B1 | 7/2019 | Desai et al. |
| 10,397,928 B1 | 8/2019 | Hahn et al. |

(Continued)

FOREIGN PATENT DOCUMENTS

EP        3300445 A1    3/2018

OTHER PUBLICATIONS

PCT, Notification of Transmittal of The International Search Report and The Written Opinion of the International Searching Authority, or The Declaration for Application PCT/US2021/070069 dated May 26, 2021.

*Primary Examiner* — Inder P Mehra
(74) *Attorney, Agent, or Firm* — Patterson + Sheridan, LLP

(57) ABSTRACT

Embodiments herein describe techniques for conveying performance parameters to client devices using BSS coloring. IEEE 802.11ax introduced BSS color to help with interference between BSSs operating in the same channel or partially overlapping channels in a frequency band. The BSS colors are typically assigned at random. However, in the embodiments herein, the BSS colors can still be relied to help with co-channel interference as intended by IEEE 802.11ax but also can convey performance parameters to the client devices. The AP can leverage the BSS color to convey (or encode) a performance parameter such as radio frequency (RF) conditions, quality of service (QoS) conditions, or a policy of the network in response to expected (or future) conditions to receiving client devices.

20 Claims, 6 Drawing Sheets

(56) References Cited

U.S. PATENT DOCUMENTS

| | | |
|---|---|---|
| 10,412,617 B2 | 9/2019 | Pandey et al. |
| 2004/0246922 A1* | 12/2004 | Ruan ............... H04W 48/20 |
| | | 370/331 |
| 2018/0184285 A1 | 6/2018 | Patil et al. |
| 2018/0310279 A1 | 10/2018 | Pathak et al. |
| 2018/0368151 A9 | 12/2018 | Cariou et al. |
| 2019/0335354 A1 | 10/2019 | Pandey et al. |
| 2019/0342891 A1* | 11/2019 | Asterjadhi ............ H04W 84/12 |
| 2020/0404549 A1* | 12/2020 | Verma ................. H04W 48/20 |
| 2021/0037450 A1* | 2/2021 | Huang ................ H04W 24/08 |
| 2021/0084607 A1* | 3/2021 | Dupray ............... G01C 21/206 |

* cited by examiner

COLOR MAP
500

| BSS COLOR 505A | FIRST PERFORMANCE VALUE 510A |
| | SECOND PERFORMANCE VALUE 515A |
| BSS COLOR 505B | FIRST PERFORMANCE VALUE 510B |
| | SECOND PERFORMANCE VALUE 515B |
| ⋮ | ⋮ |
| BSS COLOR 505N | FIRST PERFORMANCE VALUE 510N |
| | SECOND PERFORMANCE VALUE 515N |

FIG. 5

BSS-COLOR GRADING IN A WLAN INFRASTRUCTURE

TECHNICAL FIELD

Embodiments presented in this disclosure generally relate to using basic service set (BSS)-coloring to convey information regarding an access point (AP) or wireless channel to client devices.

BACKGROUND

A BSS includes at least one AP and one or more endpoints (referred to herein as client devices) that are in wireless communication. IEEE 802.11ax (i.e., Wi-Fi 6) compatible radios can differentiate between BSSs using a BSS color value when other radios transmit on the same channel in the same frequency band (e.g., the 2.4 GHz, 5 GHz, or 6 GHz frequency bands). If the BSS color in a received frame is the same as the color of the receiving network device, this is considered to be an intra-BSS frame transmission. In other words, the transmitting radio belongs to the same BSS as the receiving network device. If the detected frame has a different BSS color from the receiving network device, then the client device considers that frame as an inter-BSS frame from an overlapping BSS. In this manner, using colors helps APs and client devices to identify overlapping BSS where network devices in other BSSs are within wireless communication.

APs often overlap with one or more other BSSs (i.e., the APs are within transmission range of, and using the same channel as, one or more of the devices that define the other BSS). This can result in color collision which occurs when the AP receives a frame from a wireless device associated with an overlapping BSS that is using the same color. To eliminate color collision, an AP can change its BSS color (as well as the color of all the other client devices in the same BSS) if it detects an overlapping BSS using the same color.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 5 illustrates a color map for coding performance parameters into a BSS color, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
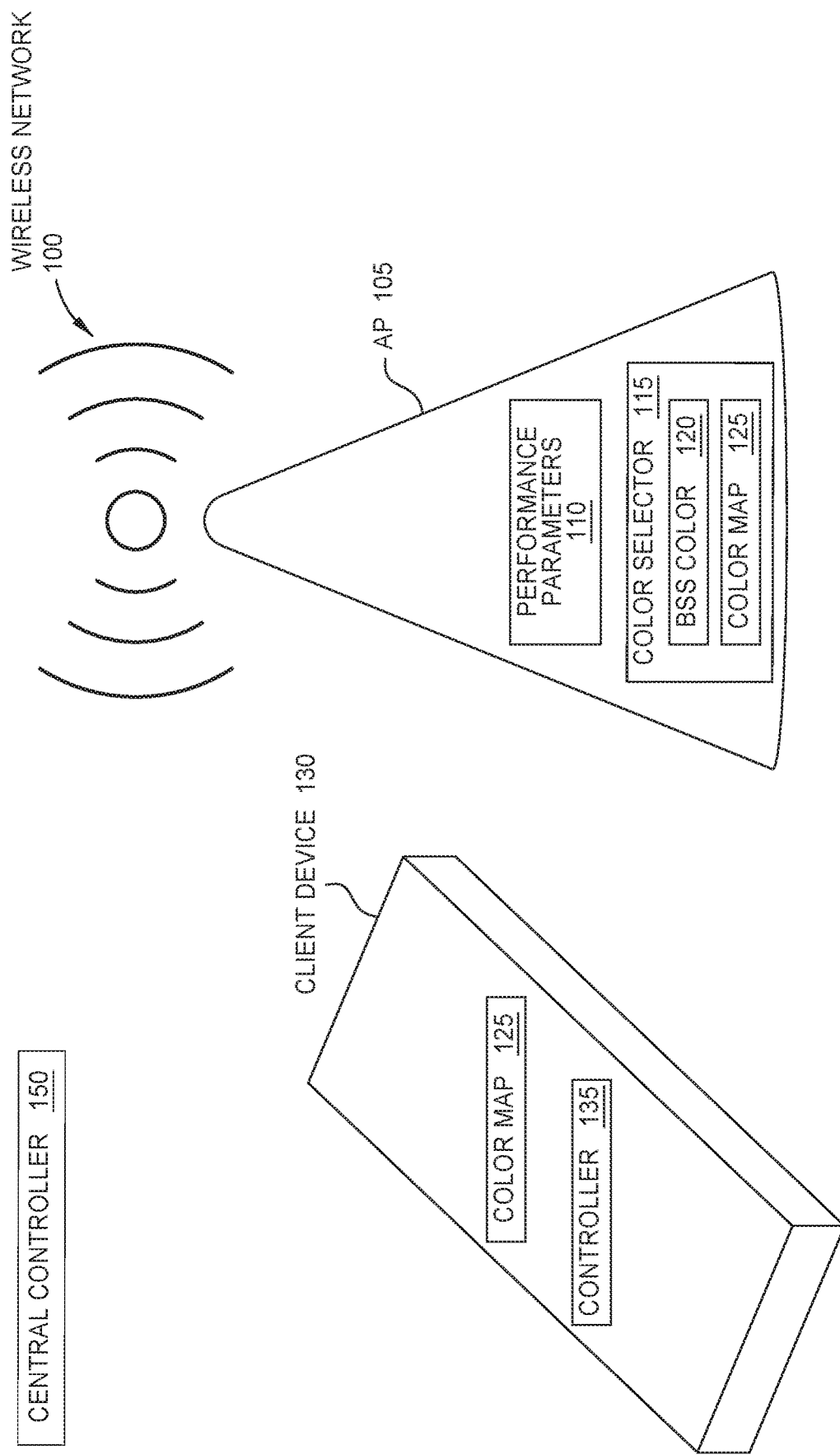
FIG. 1 illustrates a wireless network that uses BSS-coloring to convey a performance parameter to client devices, according to one embodiment.

One embodiment presented in this disclosure is a method that includes identifying a value of a first performance parameter associated with at least one of an access point (AP) or a wireless channel, selecting, using a color map, a basic service set (BSS) color for a BSS based on the value of the first performance parameter, where the color map maps a plurality of values of the first performance parameter to corresponding values of the BSS color, and wirelessly transmitting the BSS color from the AP to a client device, where the client device is configured to interpret the BSS color to identify the value of the first performance parameter.

One embodiment presented in this disclosure is an AP that includes a processor and memory comprising a program configured to perform an operation when executed by the processor. The operation includes identifying a value of a first performance parameter associated with at least one of the AP or a wireless channel, selecting, using a color map, a BSS color for a BSS based on the value of the first performance parameter where the color map maps a plurality of values of the first performance parameter to corresponding values of the BSS color, and wirelessly transmitting the BSS color to a client device.

One embodiment presented in this disclosure is a wireless device that includes a processor and memory including a program configured to perform an operation when executed by the processor. The operation includes receiving a first wireless packet from an AP where the first wireless packet comprising a BSS color selected to represent a value of a first performance parameter, identifying the value of the first performance parameter from the BSS color using a color map where the color map maps a plurality of values of the first performance parameter to corresponding values of the BSS color, and determining an action to take in response to identifying the value of the first performance parameter.

EXAMPLE EMBODIMENTS

Embodiments herein describe techniques for conveying performance parameters to client devices using BSS coloring. IEEE 802.11ax introduced BSS color to help with interference between BSSs operating in the same channel or partially overlapping channels in a frequency band. The BSS colors are typically assigned at random. In the embodiments disclosed herein, the BSS colors are not assigned at random but can still be relied on to help with co-channel interference as intended by IEEE 802.11ax while also conveying performance parameters to the client devices. Put differently, rather than selecting a BSS color at random, the AP can leverage the BSS color to convey (or encode) a performance parameter such as radio frequency (RF) conditions, quality of service (QoS) conditions, or a policy of the network in response to expected (or future) conditions.

In one embodiment, the BSS color values correspond to respective values of the performance parameter. For example, if the performance parameter is the load on the AP or the channel, a green BSS color indicates a light load, a yellow BSS color indicates a medium load, and a red BSS color indicates a heavy load. Although actual colors are described herein, in IEEE 802.11ax, the BSS color is a 6-bit value (e.g., 0-63). Each of these BSS color values can be mapped to a different value of the performance parameter. Thus, rather than selecting different BSS color values at random, the AP (or a central controller) can select a BSS color value that best represents the value of the performance parameter (assuming that BSS color value is not currently being used by a neighboring BSS).

In another embodiment, the 64 different BSS color values can be divided into separate buckets that each have sub-values, referred to as shades. For example, the 64 BSS color values can be divided into eight buckets or colors that each have eight shades—e.g., a green bucket with eight different shades of green, a blue bucket with eight different shades of blue, an orange bucket with eight different shades of orange, and so forth. The color buckets can represent a first performance parameter while the shades in the buckets can represent a second, different performance parameter. For example, the eight color buckets may each represent a different value of the first performance parameter (e.g., load on the AP or the channel) while each of the shades represent a different value of the second performance parameter (e.g., the likelihood of radar being detected in the channel). Using a color map, a client device can identify the values of the first and second performance parameters from the BSS color. In this manner, a single BSS color value can represent values for multiple performance parameters.

In another embodiment, the performance parameters being represented by the BSS color can change. For example, at Time 1, the BSS color transmitted by the AP may represent the values of a first set of performance parameters (where a set can be one or more) but at Time 2, the BSS color represents the values of a second set of performance parameters. The AP and client devices can be synchronized to know which parameters are currently being represented by the BSS color, and thus, can properly select and interpret the BSS color value.

FIG. 1 illustrates a wireless network 100 that uses BSS-coloring to convey a performance parameter 110 to client devices 130, according to one embodiment. The wireless network 100 includes an AP 105 that communicates with a client device 130 (e.g., a wireless device). The AP 105 transmits wireless packets (e.g., beacons) to the client device 130 that include a BSS color 120 in their header. In one embodiment, each BSS in the wireless network 100 is assigned their own BSS color 120 either by an AP 105 or by a central controller 150. If a client device 130 or AP 105 detects that a BSS has the same color as its BSS, the AP 105 or the central controller 150 may select a different BSS color 120. As such, the BSS color 120 can change to avoid BSSs using the same channel or a partially overlapping channels from having the same BSS color.

In addition, the AP 105 includes a color selector 115 (e.g., a software application, firmware, hardware, or combinations thereof) for changing the value of the BSS color 120 in response to the performance parameter 110. That is, the particular value of the BSS color 120 may map to a particular value of the performance parameter 110. In this manner, the BSS color 120 has a dual function: (i) to help with co-channel interference (when BSSs on the same channel or overlapping channels use different BSS color values); and (ii) represent a value of the performance parameter 110. In FIG. 1, the color selector 115 includes a color map 125 which maps values of the performance parameter 110 to values of the BSS color 120. Once the value of the performance parameter 110 is known, the color selector 115 uses the color map 125 to identify the corresponding value of the BSS color 120.

The client device 130 also stores the same color map 125 in its memory. Thus, when the client device 130 receives a wireless packet with the BSS color 120, a controller 135 (e.g., a processing element) in the client device 130 can use the color map 125 to correlate the value of the BSS color 120 to a value of the performance parameter 110. In this manner, the AP 105 (or the central controller 150) can select a BSS color 120 to represent a value of the performance parameter 110. Any client devices 130 that receive the BSS color 120 can then use their own color maps 125 to identify the value of the performance parameter 110. In this manner, the BSS color 120 provides a side band communication channel to convey values of the performance parameter 110 to the client devices 130 so these devices 130 can make intelligent decisions.

The performance parameter 110 can be any information the AP 105 (or the central controller 150) wants to convey to the client devices 130. Some non-limiting types of the performance parameter 110 include RF conditions of the wireless channel or AP, QoS conditions, or a policy of the network in response to expected (or future) conditions. RF conditions can include the load or available bandwidth of the AP 105 or the channel used by the BSS or the AP 105. For example, the higher the value of the BSS color 120 may indicate the higher the load on the AP 105, and vice versa. Because multiple BSS on the same channel may have the same value of the performance parameters, multiple BSS colors 120 may be mapped to the same value of the performance parameters. For example, the BSS color values of 0-8 may represent a very light load, the BSS color values of 9-15 represent a light load, the BSS color values of 16-23 represent a light to moderate load, the BSS color values of 24-31 represent a moderate load, and so forth. Thus, if two BSS using the same channel have the same performance value (e.g., a moderate load), they can use different BSS colors but still represent the same value of the performance parameter (e.g., BSS color values of 24 and 25 both correspond to an AP with a moderate load).

In one embodiment, the available BSS colors are graded based on a capacity index of a radio in the AP. Radio capacity index (e.g., a RF condition) can be measured by isolating the sum of total Wi-Fi plus Non-Wi-Fi contention which represents the total contention at radio's serving channel. When available, time window based averaging can be factored to avoid spikes and represent average contention in the wireless network. This number is then deducted from the total available capacity at the radio. This way, a color value represented by the BSS color can translate into an expression of the spectrum quality measured over time at the radio. The lower the color value, the lower the spectrum quality and vice versa. In one embodiment, the resulting color value is discrete in nature. Color change can happen at (configurable/pre-determined) thresholds, so as to ensure color stability while allowing color change when conditions change significantly.

Example QoS conditions that can be used as the performance parameter include a measure of a voice or video QoS of the AP 105 or the channel. Examples of a policy of the network and key performance indicators (KPIs) can include a steering policy where the central controller 150 or the AP 105 steers the clients to a desired AP(s). For example, as users enter a stadium, the central controller 150 can predict that the users (and their client devices 130) will pass through APs servicing the entrances of the stadium and eventually settle at seating areas serviced by different APs. The APs 105 can advertise BSS color values which steer the clients to the APs at the seating areas rather than using the APs at the entrance (since the load on those APs is expected to be high).

In another example, a policy may indicate that at a certain time of day, the load on an AP increases dramatically (for example, due to a regularly scheduled meeting). The central controller 150 or the APs 105 can use the BSS colors to preemptively steer clients away from that AP to neighboring APs (e.g., fifteen minutes before the meeting begins) in anticipation that the load on the AP is going to increase in the near future. In this manner, the performance parameter 110 can be part of a policy of the wireless network 100.

In another example, sites susceptible to higher radar hits are assigned a BSS color grading to indicate the likelihood of radar being present in the corresponding channel. APs more susceptible to radar interference advertise lower BSS color values while radios capable of advance radar detection algorithms and Dual Dynamic Frequency Selection (DFS) capabilities would advertise higher BSS color values. The same logic can be applied to any other type of interferer or KPI. For example, BSS coloring can also be used to advertise consistent peak load times and BSSs with high or low variation in their load.

Figure 2:
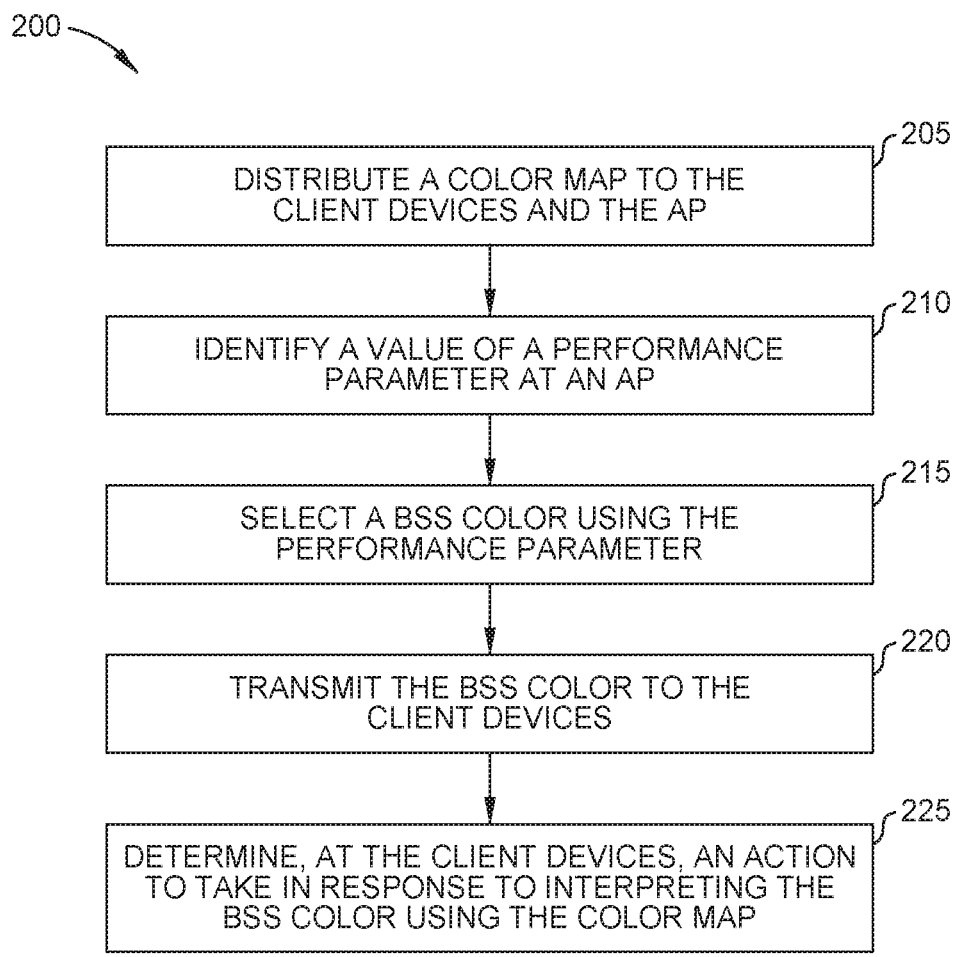
FIG. 2 is a flowchart for using BSS-coloring to convey a performance parameter of an AP to client devices, according to one embodiment.

FIG. 2 is a flowchart of a method 200 for using BSS-coloring to convey a performance parameter of an AP to client devices, according to one embodiment. At block 205, a central controller distributes a color map to the client devices and the AP. In one embodiment, the central controller provides a color map to the APs which, in turn provide the color map to their associated client devices or roaming client devices. As mentioned above, the color map permits the AP to select a BSS color to represent a particular value of a performance parameter. On the other hand, the color map permits the client devices to interpret or decode a BSS color in a received wireless packet to identify the value of the performance parameter. Thus, in this embodiment, the color maps in the AP and the associated client devices should be the same (or at least use the same color mapping) so that the performance parameter can be accurately represented by the BSS color.

At block 210, the color selector evaluates a performance parameter at the AP. As mentioned above, the performance parameter may include, e.g., RF conditions, QoS conditions, or a policy of the network in response to expected conditions. The color selector identifies a particular value of the performance parameter which is then used to select the BSS color.

In one embodiment, the performance parameter is a long term view of the RF or QoS conditions of the channel or the AP. For example, IEEE 802.11e introduced an information element QoS Basic Service Set (QBSS) which is the area serviced by an AP. The AP can transmit beacons that use a scatter number to represent current load. This scatter number is updated frequently (e.g., every five seconds), and as a result, may not accurately represent the actual load on the AP. A client device searching for a new AP to join can switch between the channels and identify the current load of the AP by receiving these special beacons. However, if the client device makes a decision whether to associate with the AP (e.g., join its BSS) based on this scatter number, it may make a poor decision since the load on the AP can fluctuate dramatically. Thus, relying on the scatter number can be a poor indicator of the actual RF and QoS conditions of an AP or channel.

In contrast, the performance parameter described herein could be generated using a more historical approach (e.g., consider performance data such as RF or QoS conditions over a longer time period). That is, every 1-5 minutes the color selector may re-evaluate the performance parameter to determine whether the BSS color should be changed. In this manner, method 200 can be used to provide a more accurate view of the performance of the AP or the channel to roaming client devices when compared to the scatter number described in IEEE 802.11e.

At block 215, the color selector selects a BSS color using the performance parameter. In one embodiment, the color selector identifies a particular value of the performance parameter. The color selector then uses that value to index into the color map to identify a BSS color value that corresponds to that value of the performance parameter. In this manner, the color map associates the values of the performance parameter with corresponding values of the BSS color.

In one embodiment, the color selector ensures that the selected BSS color is not used by another BSS in the same channel or in a partially overlapping channel. If so, the color selector may select the next closest BSS color value that is unused. Thus, the BSS color value may not precisely represent the performance parameter, but given that there are 64 different BSS colors values (which provide significant granularity for representing the performance parameter), selecting the next available BSS color value may not lead to a substantial loss of accuracy. In another embodiment, a particular value of the performance parameter may correspond to a range of BSS color values in the color map. In that case, the color selector can select one of the BSS color values in that range that are unused.

At block 220, the AP transmits the selected BSS color to the client devices. Any client device that is currently using the channel can receive the BSS color from the AP (whether or not the client device is currently associated with the AP or is in the same BSS as the AP).

As mentioned above, the color selector in the AP may at intervals—e.g., every 1-5 minutes—re-evaluate the performance parameter and if its value has changed, select a different BSS color. The client devices in the same BSS as the AP will detect that the BSS color has changed, and change their BSS color accordingly to match the new BSS color value transmitted by the AP. However, the AP can select a new BSS color at much smaller intervals than 1-5 minutes, or much larger intervals than 1-5 minutes.

Further, the method 200 is compatible with IEEE 802.11ax where the color selector in an AP may change the BSS color when there is a collision where another BSS in the same or overlapping channel has the same BSS color. In that case, when selecting another BSS color due to a collision, the color selector may nonetheless select a new BSS color value that best represents the value of the performance parameter.

At block 225, a client device determines an action to take in response to interpreting the BSS color using the color map. That is, after receiving the BSS color, the client device can use the color map received at block 205 to interpret or decode the BSS color to identify the performance parameter value it represents. The client device can then use this value to make more informed decisions. For example, if the client device is currently scanning the channels in a frequency band to determine the best AP to associate with, the client device may use the value of the performance parameter to determine whether to associate with the corresponding AP broadcasting the BSS color. In another example, the client device may already be part of the same BSS of the AP. However, the AP may transmit a new BSS color which triggers the client device to roam to a different AP or BSS. For example, the new BSS color may indicate that the QoS conditions of the AP have fallen below a minimum QoS threshold required by an application executing on the client device. The client device may then begin to roam and evaluate the BSS colors advertised by neighboring APs to determine whether their QoS conditions are better—i.e., satisfy its minimum QoS threshold.

Further, the information learned by the client device by interpreting the BSS color can be combined with other information to determine what action to take. For example, the client device may also use the scatter numbers provided by IEEE 802.11e in combination with the performance parameter value represented by the BSS color to decide what action to take.

Figure 3:
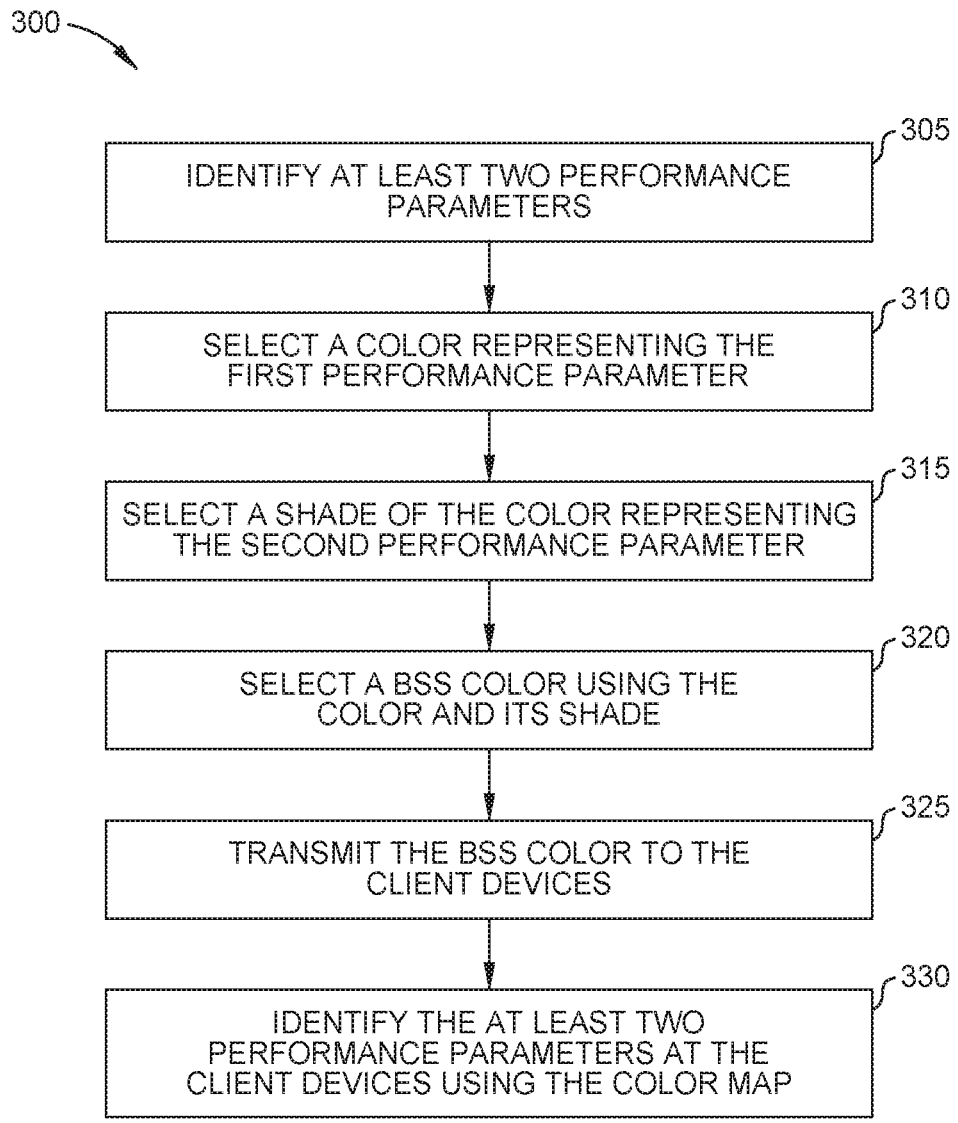
FIG. 3 is a flowchart for using BSS-coloring to convey multiple performance parameters of an AP to client devices, according to one embodiment.

FIG. 3 is a flowchart of a method 300 for using BSS-coloring to convey multiple performance parameters of an AP to client devices, according to one embodiment. At block 305, the color selector identifies at least two performance parameters to be represented by a BSS color. For example, a first performance parameter may be a RF condition while a second performance parameter may be a QoS condition or based on a network policy. Method 300 discusses various techniques for representing values of multiple performance parameters using a single BSS color value.

At block 310, the color selector selects a color representing the first performance parameter. For example, the BSS color values may be divided into different color buckets (e.g., BSS color values 0-7 are a first color bucket, BSS color values 8-15 are a second color bucket, BSS color values 16-23 are a third color bucket, and so forth). Each color bucket can correspond to a different value (or values) of the first performance parameter. For example, assuming there are 8 color buckets, each color bucket may represent a different load on the AP. If the performance parameter and the color buckets can be expressed numerically, the color selector may select the color bucket that is closest to the actual value of the performance parameter.

At block 315, the color selector selects a shade within the selected color (e.g., the select color bucket) representing the second performance parameter. For example, if the 64 BSS color values are divided into eight colors (or color buckets), each color can have eight shades. The eight shades can represent eight different values of the second performance parameter. The color selector can select the shade in the selected color bucket that best represents the value of the second performance parameter.

Figure 4:
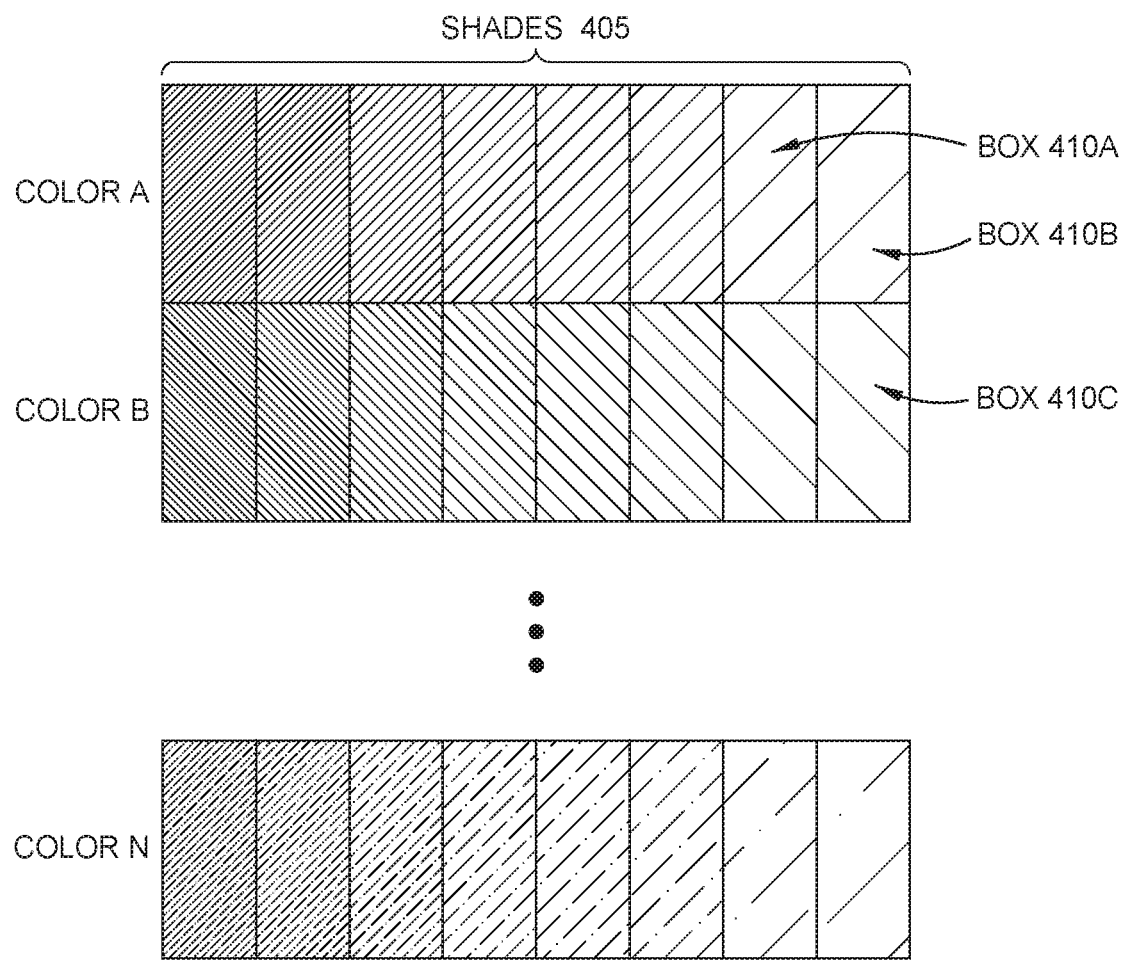
FIG. 4 is a graphical representation of using color and shade of BSS-coloring to represent multiple performance parameters, according to one embodiment.

FIG. 4 is a graphical representation of using color and shade of BSS-coloring to represent multiple performance parameters, according to one embodiment. As shown, the rows are different colors or color buckets. Each color can represent a different value of a first performance parameter. That is, Color A can represent a first extreme value of the first performance parameter while Color N represents the opposite extreme value of the first performance parameter. The colors between Color A and Color N can represent intermediate values that can vary either linearly or non-linearly. The color selector can select the color that best represents the value of the first performance parameter.

The columns in FIG. 4 are different shades of the colors (or color buckets). Each shade can represent a different value of a second performance parameter. That is, the leftmost shade in a row can represent a first extreme value of the second performance parameter while the rightmost shade in the same row represents the opposite extreme value of the second performance parameter. The shades in the middle can represent intermediate values that can vary either linearly or non-linearly. The color selector can select the shade that best represents the value of the second performance parameter.

In one embodiment, the same shades in different rows represent the same values of the second performance parameter. That is, regardless whether Color A or Color N was selected, the corresponding shades in those rows correspond to the same value of the second performance parameter. For example, the leftmost shade in the Color A row corresponds to the same value of the second performance parameter as the leftmost shade in the Color B or N rows. The second from the left shade in the Color A row corresponds to the same value of the second performance parameter as the second from the left shade in the Color B or N rows, and so forth. In this manner, the color mapping illustrated in FIG. 4 can independently represent the values of two different performance parameters.

Each box 410 in FIG. 4 represents a unique BSS color value. Each BSS color represents a unique combination of the values of the first and second performance parameters. For example, the BSS color values for box 410A and 410B represent the same value of the first performance parameter (since they are in the same row—i.e., the same color) but represent different values of the second performance parameter (since they are in different columns)—i.e., are different shades 405. Conversely, the BSS colors values for box 410B and 410C represent the same value of the second performance parameter since they are assigned the same shade 405—i.e., are in the same column—but represent different values of the first performance parameter since they are assigned to different rows—i.e., different colors or color buckets. In this manner, the BSS color values can each represent different combinations of values of multiple performance parameters.

Further, while FIG. 4 illustrates BSS color values representing values for two independent performance parameters, the scheme could be further sub-divided so each BSS color can represent values for three performance parameters. For example, the shades 405 in each row could be further sub-divided to represent a third performance parameter. For instance, each row (or color) can have four shades rather than the eight shown in FIG. 4. Further, each of those four shades correspond to two sub-shades so that each row or color has four shades, and each shade has two sub-shades. In this example, the values of the second performance parameter can be represented by the four shades in each row. The values of the third performance parameter can then be represented by the two sub-shades of each shade. For example, the third performance parameter may be whether a special function or feature of the AP is activate or inactive. One sub-shade in each shade means the special function is active while the other indicates the feature is inactive. The tradeoff is that the system loses granularity when representing the values of the second performance parameter (e.g., goes from eight potential values to four values) but can then represent values for a third performance parameter independently from the values of the first and second performance parameters.

Moreover, the examples discussed with FIG. 4 are just some of the examples for assigning the BSS colors values to represent multiple performance parameters. While specific examples for representing two and three performance parameters, other assignments can be used where each BSS color value can represent values for four or more performance parameters.

Returning to method 300, at block 320 the color selector selects a BSS color using the color and its shade. As mentioned above in FIG. 4, each box 410 can represent a unique BSS color value which in turn represents values for multiple performance parameters. By identifying the color and the shade corresponding to the values of the first and second performance parameters, the color selector can use the color map to identify the BSS color.

At block 325, the AP transmits the BSS color to the client devices. The BSS color can be transmitted using an special or generic wireless packets (e.g., beacons). In one embodiment, the BSS color is included in a predefined bit location in the packet header. In IEEE 802.11ax, the BSS color is presented by a six-bit value in the header, although the embodiments are not limited to that implementation.

At block 330, the client devices identify the values of the at least two parameters using the color map. This color map may include the same mapping in the color map used by the AP when selecting the BSS color. As a result, the client devices can accurately decode the BSS color to identify the values of the performance parameters.

FIG. 5 illustrates a color map 500 for mapping performance parameters to a BSS color, according to one embodiment. FIG. 5 illustrates an arrangement of the color map 500 that may be preferred by a client device in order to decode or interpret a received BSS color. The color map 500 includes two columns where the left column lists the various BSS colors that can be transmitted by an AP (and received by the client devices). The map 500 may include as many rows as there are possible BSS color values. The right column includes the corresponding values of the first and second performance parameters.

As shown, each BSS color 505 corresponds to a first performance value 510 and a second performance value 515. The client device can use the received BSS color value to index into the left column to identify a particular row in the color map 520. Once the BSS color 505 is identified, the client device can select the corresponding first and second performance values 510, 515 in the same row. In this manner, the client devices can interpret or decode a received BSS color to identify values of multiple performance parameters using the color map 500. For example, if the received BSS color matches the BSS color 505B, the client device knows this color represents a first performance value 510B of the first performance parameter and a second performance value 515B of the second performance parameter.

Figure 6:
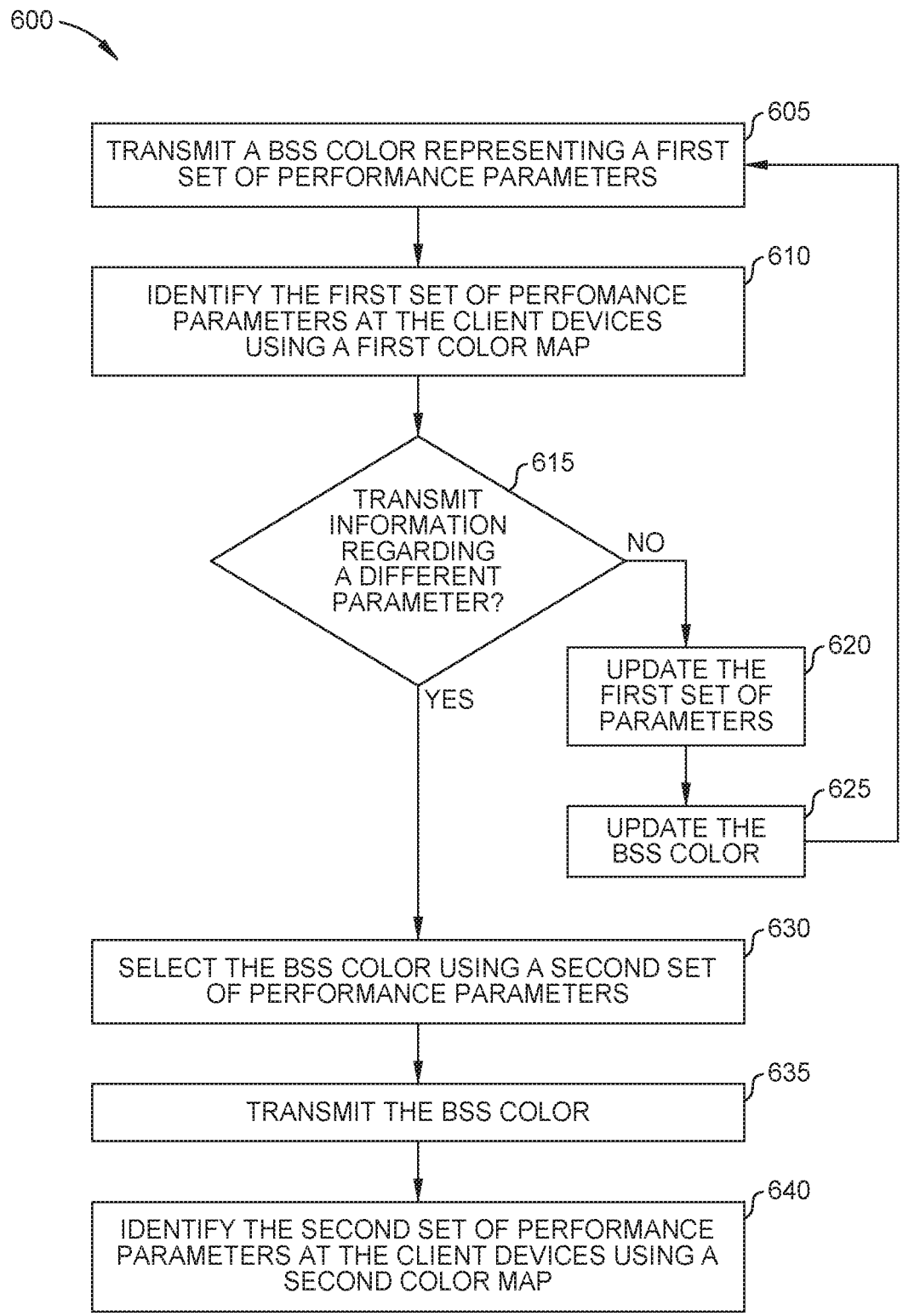
FIG. 6 is a flowchart for encoding different performance parameters at different times into a BSS color, according to one embodiment.

FIG. 6 is a flowchart of a method 600 for encoding different performance parameters at different times into a BSS color, according to one embodiment. At block 605, the AP transmits a BSS color representing a first set of performance parameters, where a set is one or more performance parameters. That is, the AP can use method 200 or 300 to select a BSS color to represent a value (or values) of the first set of performance parameters.

At block 610, the client device identifies the first set of performance parameters using a first color map. That is, the client device can use the same color map (or the same color mappings) used by the AP when selecting the BSS color. That way, the client devices can accurately identify the values of the first set of performance parameters identified by the AP.

At block 615, the AP determines whether to transmit information regarding a different parameter. In one embodiment, the AP uses a predefined schedule to identify time periods corresponding to different performance parameters. For example, during a first time period, the AP transmits BSS colors representing the first set of performance parameters, during a second time period that occurs after the first time period, the AP transmits BSS colors representing a second set of performance parameters, during a third time period that occurs after the second time period, the AP transmits BSS colors representing a third set of performance parameters, and so forth. Further, this schedule may be shared by the AP and the client devices so that the client devices know set of performance parameters is currently being represented by a BSS color. In this manner, the AP and the client devices can be synchronized to transmit different sets of performance parameters. Further, the time periods may be any desired length. For example, the time periods in the schedule may be 1 to 10 minutes in length.

If the AP determines not to transmit information for a different parameter (e.g., the first time period has not yet expired), the method 600 proceeds to block 620 where the AP updates the first set of parameters. For example, the color selector may measure or re-evaluate the first set of parameters to determine whether their values have changed.

At block 625, the color selector updates the BSS color (assuming the values of the first set of parameters has changed). The method 600 then returns to block 605 to transmit the updated BSS color (or the same BSS color if the values of the first set of parameters have not changed).

However, if the first time period has expired and the AP decides to transmit information for a different parameter, the method 600 proceeds from block 615 to block 630 where the AP selects the BSS color using values from a second set of performance parameters. That is, the AP switches to a second time period where it transmits a BSS color to represent the second set of performance parameters.

In one embodiment, the AP uses a different color map to identify the BSS color representing the second set of performance parameters than the color map used to identify the BSS color representing the first set of performance parameters. Put differently, when switching between the time periods, the AP also switches between different color maps (or to different portions of the same color map) so the AP can select an BSS color representing the second set of performance parameters.

At block 635, the AP transmits the BSS color to the client devices. At block 640, the client devices identifies the second set of performance parameters using the same color map (or the same color mapping) used by the AP when selecting the BSS color at block 630—e.g., a second color map. The client devices can follow the same predefined schedule as the AP (e.g., their clocks are synchronized) so that the client device knows what set of performance parameters are currently being represented by the BSS color.

However, in another embodiment, rather than the AP and the client device following the same predefined schedule, the AP may transmit metadata in the packet (or in a separate packet) that indicates what set of performance parameters are being represented by the BSS color. Using this metadata, the client device can select the appropriate color map to use when interpreting the BSS color. In this manner, the method 600 provides techniques for the AP to transmit values for different sets of performance parameters at different times. The client devices can identify what color map to use to interpret the BSS color using, e.g., a predefined schedule or metadata provided by the AP.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
identifying a value of a first performance parameter associated with at least one of an access point (AP) or a wireless channel;
selecting, using a color map, a basic service set (BSS) color for a BSS to represent the value of the first performance parameter, wherein the color map maps a plurality of values of the first performance parameter to corresponding values of the BSS color; and
wirelessly transmitting the BSS color from the AP to a client device, wherein the client device is configured to interpret the BSS color to identify the value of the first performance parameter.

2. The method of claim 1, wherein the client device uses a color mapping defined in the color map used by the AP to identify the value of the first performance parameter.

3. The method of claim 1, wherein the first performance parameter is different from a BSS color and is based at least on a radio frequency condition of the AP or the wireless channel, a quality of service condition of the AP or the wireless channel, or a policy of a wireless network in response to expected conditions.

4. The method of claim 1, further comprising:
identifying a value of a second performance parameter associated with at least one of the AP or the wireless channel, wherein the BSS color is also selected based on the value of the second performance parameter.

5. The method of claim 4, wherein selecting the BSS color comprises:
   selecting a first color from a plurality of colors based on the value of the first performance parameter, wherein each of the plurality of colors comprises a plurality of shades; and
   selecting a first shade from the plurality of shades corresponding to the first color based on the value of the second performance parameter; and
   selecting the BSS color based on the first color and the first shade.

6. The method of claim 1, further comprising:
   determining to transmit information regarding a second performance parameter rather than the first performance parameter;
   identifying a value of the second performance parameter associated with at least one of the AP or the wireless channel; and
   selecting, using a second color map, the BSS color for the BSS based on the value of the second performance parameter, wherein the second color map maps a plurality of values of the second performance parameter to corresponding values of the BSS color.

7. The method of claim 6, wherein determining to transmit information regarding the second performance parameter is based on a predefined schedule indicating a first time period for transmitting information regarding the first performance parameter and a second time period for transmitting information regarding the second performance parameter.

8. An AP, comprising:
   a processor; and
   memory comprising a program configured to perform an operation when executed by the processor, the operation comprises:
      identifying a value of a first performance parameter associated with at least one of the AP or a wireless channel;
      selecting, using a color map, a BSS color for a BSS to represent the value of the first performance parameter, wherein the color map maps a plurality of values of the first performance parameter to corresponding values of the BSS color; and
      wirelessly transmitting the BSS color to a client device.

9. The AP of claim 8, wherein the BSS color is compatible with IEEE 802.11ax.

10. The AP of claim 8, wherein the first performance parameter is based at least on a radio frequency condition of the AP or the wireless channel, a quality of service condition of the AP or the wireless channel, or a policy of a wireless network in response to expected conditions.

11. The AP of claim 8, wherein the operation further comprises:
   identifying a value of a second performance parameter associated with at least one of the AP or the wireless channel,
   wherein the BSS color is also selected based on the value of the second performance parameter.

12. The AP of claim 11, wherein selecting the BSS color comprises:
   selecting a first color from a plurality of colors based on the value of the first performance parameter, wherein each of the plurality of colors comprises a plurality of shades; and
   selecting a first shade from the plurality of shades corresponding to the first color based on the value of the second performance parameter; and
   selecting the BSS color based on the first color and the first shade.

13. The AP of claim 12, wherein the operation further comprises:
   determining to transmit information regarding the second performance parameter rather than the first performance parameter;
   identifying the value of the second performance parameter associated with at least one of the AP or the wireless channel; and
   selecting, using a second color map, the BSS color for the BSS based on the value of the second performance parameter, wherein the second color map maps a plurality of values of the second performance parameter to corresponding values of the BSS color.

14. The AP of claim 13, wherein determining to transmit information regarding the second performance parameter is based on a predefined schedule indicating a first time period for transmitting information regarding the first performance parameter and a second time period for transmitting information regarding the second performance parameter.

15. A wireless device, comprising:
   a processor; and
   memory comprising a program configured to perform an operation when executed by the processor, the operation comprises:
      receiving a first wireless packet from an AP, the first wireless packet comprising a BSS color selected to represent a value of a first performance parameter;
      identifying the value of the first performance parameter from the BSS color using a color map, wherein the color map maps a plurality of values of the first performance parameter to corresponding values of the BSS color; and
      determining an action to take in response to identifying the value of the first performance parameter.

16. The wireless device of claim 15, wherein the AP uses a color mapping defined in the color map used by the wireless device to select the BSS color.

17. The wireless device of claim 15, wherein the first performance parameter is based at least on a radio frequency condition of the AP or a wireless channel, a quality of service condition of the AP or the wireless channel, or a policy of a wireless network in response to expected conditions.

18. The wireless device of claim 15, wherein the operation comprises:
   identifying a value of a second performance parameter from the BSS color using the color map.

19. The wireless device of claim 15, wherein the operation comprises:
   receiving a second wireless packet from the AP, the second wireless packet comprising the BSS color, wherein the BSS color is selected to represent a value of a second performance parameter; and
   identifying the value of the second performance parameter from the BSS color using a second color map, wherein the second color map maps a plurality of values of the second performance parameter to corresponding values of the BSS color.

20. The wireless device of claim 19, wherein the first wireless packet is received in a first time period defined by a predefined schedule for transmitting information regarding the first performance parameter and the second wireless packet is received in a second time period of the predefined schedule for transmitting information regarding the second performance parameter.

* * * * *